United States Patent [19]
Naruse et al.

[11] Patent Number: 5,492,395
[45] Date of Patent: Feb. 20, 1996

[54] ANTILOCK BRAKE CONTROL SYSTEM

[75] Inventors: Iwao Naruse, Nagoya; Motohide Takeuchi, Tokoname, both of Japan

[73] Assignee: Aisin Seiki Kabushiki Kaisha, Kariya, Japan

[21] Appl. No.: 16,191

[22] Filed: Feb. 11, 1993

Related U.S. Application Data

[63] Continuation of Ser. No. 723,159, Jun. 28, 1991, abandoned.

[30] Foreign Application Priority Data

Jun. 28, 1990 [JP] Japan .................................. 2-168341

[51] Int. Cl.⁶ .................................................. B60T 8/88
[52] U.S. Cl. ............................................... 303/122.12
[58] Field of Search ............................... 303/116.1, 92, 303/113.1, 116.3, 10, 71, DIG. 3–DIG. 4, 160, 122.12

[56] References Cited

U.S. PATENT DOCUMENTS

| | | | |
|---|---|---|---|
| 3,907,378 | 9/1975 | Leiber | 303/92 |
| 4,061,402 | 12/1977 | Peterson et al. | 303/92 |
| 4,421,361 | 12/1983 | Arikawa et al. | 303/92 |
| 4,701,854 | 10/1987 | Matsuda | 364/426.02 |
| 4,728,156 | 3/1988 | Burgdorf et al. | 303/92 |
| 4,736,992 | 4/1988 | Hendrickson | 303/92 |
| 4,869,558 | 9/1989 | Yoshino | 303/92 |

FOREIGN PATENT DOCUMENTS

| | | |
|---|---|---|
| 0152101 | 8/1985 | European Pat. Off. . |
| 0222047 | 5/1987 | European Pat. Off. . |
| 0369179 | 5/1990 | European Pat. Off. . |
| 2702800 | 7/1978 | Germany . |
| 3833473 | 4/1990 | Germany . |
| 1596938 | 9/1981 | United Kingdom . |
| 2226284 | 10/1988 | United Kingdom . |

OTHER PUBLICATIONS

Bosch Technische Berichte, Feb. 1982 pp. 65–75.

*Primary Examiner*—Matthew C. Graham
*Attorney, Agent, or Firm*—Sughrue, Mion, Zinn, Macpeak & Seas

[57] ABSTRACT

An antilock brake control system comprises an output judging device for outputing pumping signal and control signals for controlling the fluid pressure based on a signal from a sensor device for detecting the rotational speed of a wheel, and an inhibiting device for interrupting the control signals when the pumping signal indicates an abnormal condition.

1 Claim, 5 Drawing Sheets

1

ANTILOCK BRAKE CONTROL SYSTEM

This is a Continuation of application Ser. No. 07/723,159 filed Jun. 28, 1991, now abandoned.

BACKGROUND OF THE INVENTION

The present invention relates to an antilock brake control system for preventing the locked condition of each wheel during brake operation, and in particular to an antilock brake control system having a judging means for checking whether a microprocessor is in normal operation or not.

A conventional antilock brake control system is disclosed, for example, in Japanese Patent Kokai 1-246642 published in 1989 without examination.

The conventional control system has a structure shown in FIG. 5. That is to say, a microprocessor 1 includes an output port PO from which a pumping signal in the form of a pulse signal with a cycle is to be fed to a monitoring circuit 2 which is in the form of an IC and when the pumping signal becomes abnormal, the monitoring circuit 2 begins to provide a set signal to a reset terminal PR of the microprocessor 1. In addition, the pumping signal and the reset signal from the monitoring circuit 2 are to be inputted to a set reset flip-flop circuit 5 via an AND-circuit 3 and a NOT-circuit 4 respectively and an abnormal operation of the microprocessor 1 is prevented in such a manner that the power supply to the microprocessor 1 is terminated by turning off a power switching circuit 7 after an elapse of time since the input of the reset signal or the power supply switching circuit 7 is turned off.

However, in the foregoing conventional system, if the operation of the microprocessor 1 occurs after the failure or malfunction of the monitoring circuit 2 and/or the power supply switching circuit 7 while the microprocessor 1 is being supplied with the electric power, such abnormal operation of the microprocessor 1 can't be detected. Thus, as a result the microprocessor 1 continues to issue a signal which indicates an increase of the brake fluid pressure to a solenoid valve, resulting in an unexpected locked condition of each wheel or continues to issue a signal indicating a decrease of the brake fluid pressure, whereby the brake operation can't be established.

At this stage, in the conventional device shown in FIG. 5, even if the microprocessor 1 tries to check whether the monitoring circuit 2 and the power supply switching circuit 7 can operate normally or not by issuing abnormal signals thereto, the check is in vain or is no use. The reason is that the microprocessor 1 is turned off when the monitoring circuit 2 and the power supply switching circuit 7 are operating normally.

SUMMARY OF THE INVENTION

It is, therefore, a primary object of the present invention to provide an antilock control system without the foregoing drawbacks.

It is another object of the present invention to provide an antilock control system in which the abnormal operation of a microprocessor can be monitored and a safety braking operation can be assured despite the failure of a monitoring circuit for monitoring the microprocessor.

To achieve the objects and in accordance with the purposes of the present invention, an antilocking control system comprises an output judging means for outputting a pumping signal and control signals for controlling the fluid pressure based on a signal from a sensor means for detecting the number of rotation of a wheel and an inhibiting means for interrupting the control signals when the pumping signal indicates an abnormal condition.

BRIEF DESCRIPTION OF THE DRAWINGS

The above and other objects, features and advantages of the present invention will become more apparent and more readily appreciated from the following detailed description of preferred exemplary embodiments of the present invention, taken in connection with the accompanying drawings, wherein.

DETAILED DESCRIPTION OF THE PREFERRED EMBODIMENT

Hereinafter, one embodiment of an antilock brake system according to the present invention will be described with reference to the attached drawings.

Figure 1:
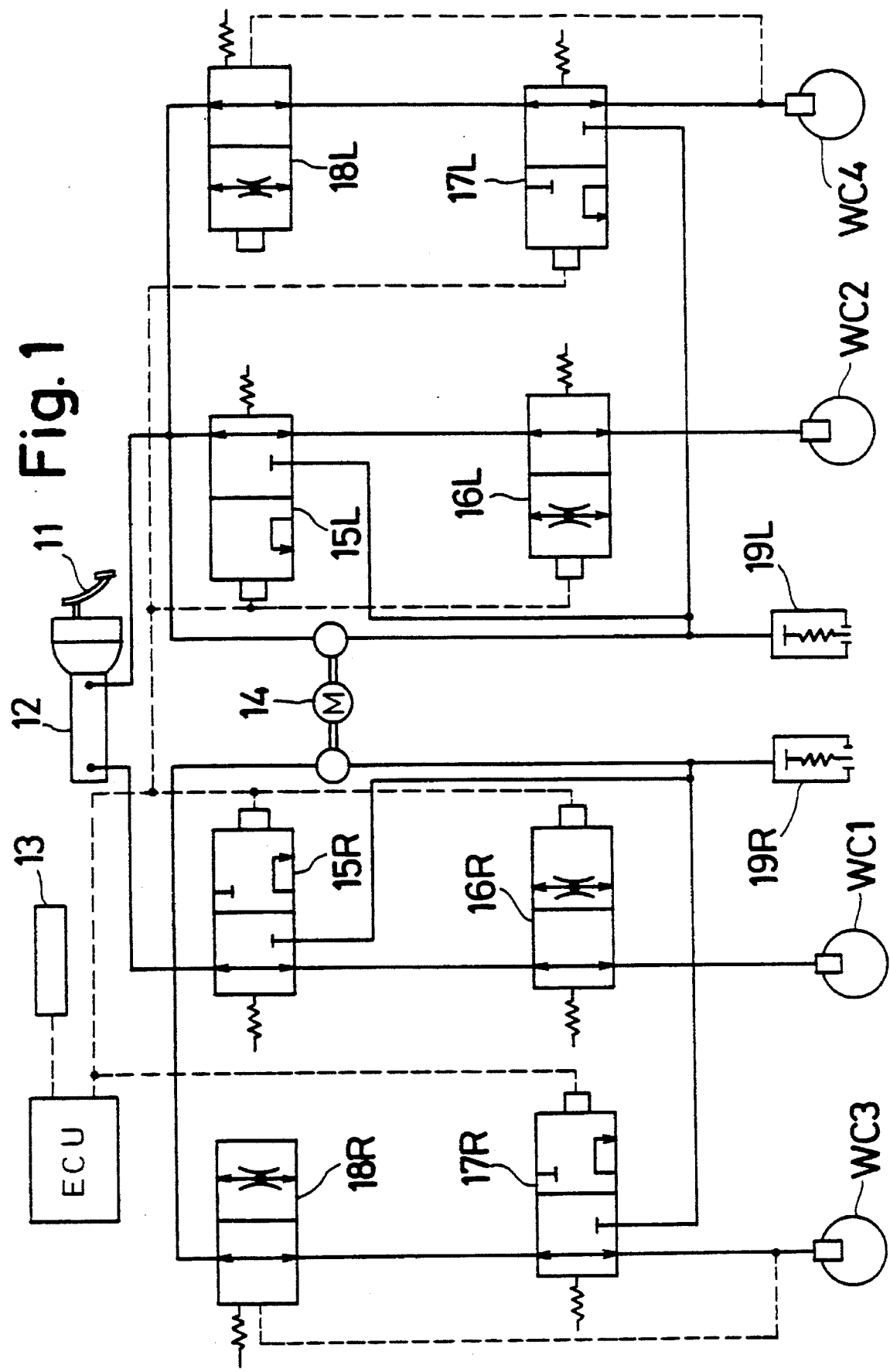
FIG. 1 is a block diagram of an antilock brake control system.

In FIG. 1 which shows an antilock brake system to be controlled by a control device according to the present invention, the system includes a brake pedal 11, a master cylinder 12, a sensor or means 13 for detecting the rotational speed of the wheel, a motor 14 for the fluid circulation, a pair of front main solenoid valves 15R and 15L, a pair of front solenoid valves 16R and 16L, a pair of rear main solenoid valves 17R and 17L, a pair of solenoid valves 18R and 18L, a pair of reservoirs 19R and 19L, and four wheel cylinders WC1, WC2, WC3 and WC4.

In the antilock brake system, upon normal brake operation, an amount of master cylinder pressure (herein after simply referred as M/C pressure) which will be developed in the mastercylinder 12 due to the depression of the brake pedal 11 is to be transmitted to the wheel cylinders WC1-4 in such a manner that the condition of each wheel cylinder remains in the illustrated condition.

When any one of the wheels is detected to be locked by an ECU due to the detecting signal thereto from the sensor 13, each of the front main solenoid valves 15R and 15L and the rear main solenoid valves 17R and 17L is transferred from its OFF-condition as illustrated to ON-condition, thereby decreasing the M/C pressure to be supplied to the wheel cylinders WC1-4. Then, when the foregoing locked condition of the wheel is released due to the resultant decrease in M/C pressure, based on the detecting signal from the sensor 13, the ECU beings the brake operation again by increasing the M/C pressure after establishing OFF-condition of each valves 15R, 15L, 17R and 17L.

The repetition of such operation brings the gradual decrease of the vehicle speed without locking each wheel entirely, thereby stopping the vehicle.

Figure 2:
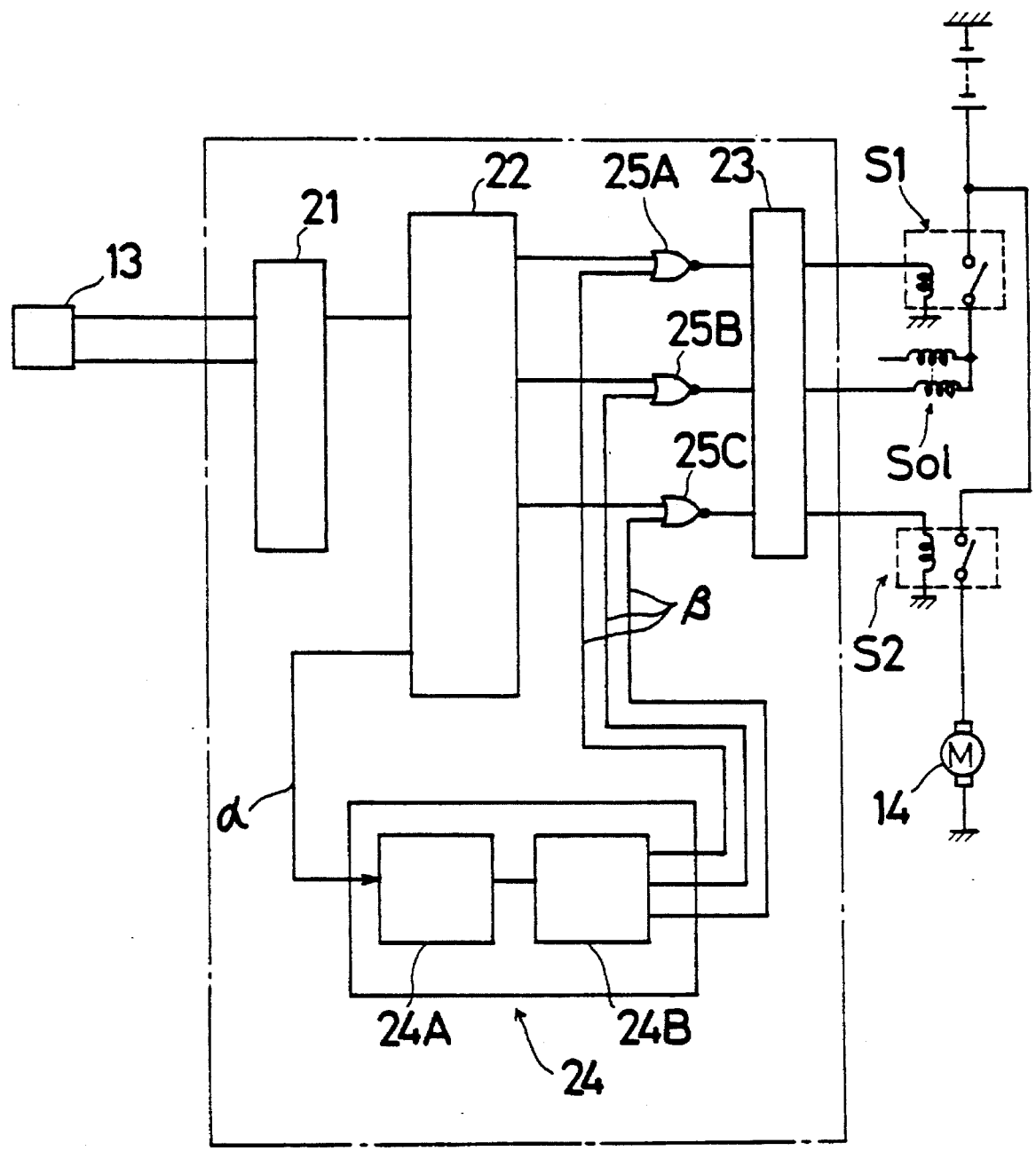
FIG. 2 is a block diagram showing a main portion of the present invention.

FIG. 2 shows a block diagram of a control circuit at an output side of the ECU, which includes an input interface 21 for receiving the detecting signal from the sensor 13, an output judging circuit or an output judging means 22 for judging an output, an output interface 23 through which ON signals or load output signals are fed from the output judging circuit 22 to a power supply electromagnetic switch (main switch) S1, a solenoid Sol of each main solenoid valve and an electromagnetic switch (operation switch) S2 for the motor 14 respectively, and an inhibition circuit 24 for inhibiting the outputting from the output judging circuit 22 upon malfunction of the ECU which has a malfunction in the detecting means 24A and an inhibiting means 24B.

The inhibiting circuit 24 is designed to determine at the malfunction detecting means 24A whether a pumping signal α shows the abnormal condition or not, and to issue inhibiting signals β, if the answer is positive, to NOR circuits 25A, 25B and 25C, thereby interrupting the output ting of ON signals from the output judging circuit 22 to the switch S1, each solenoid Sol of each main solenoid valve and the switch S2.

Figure 3:
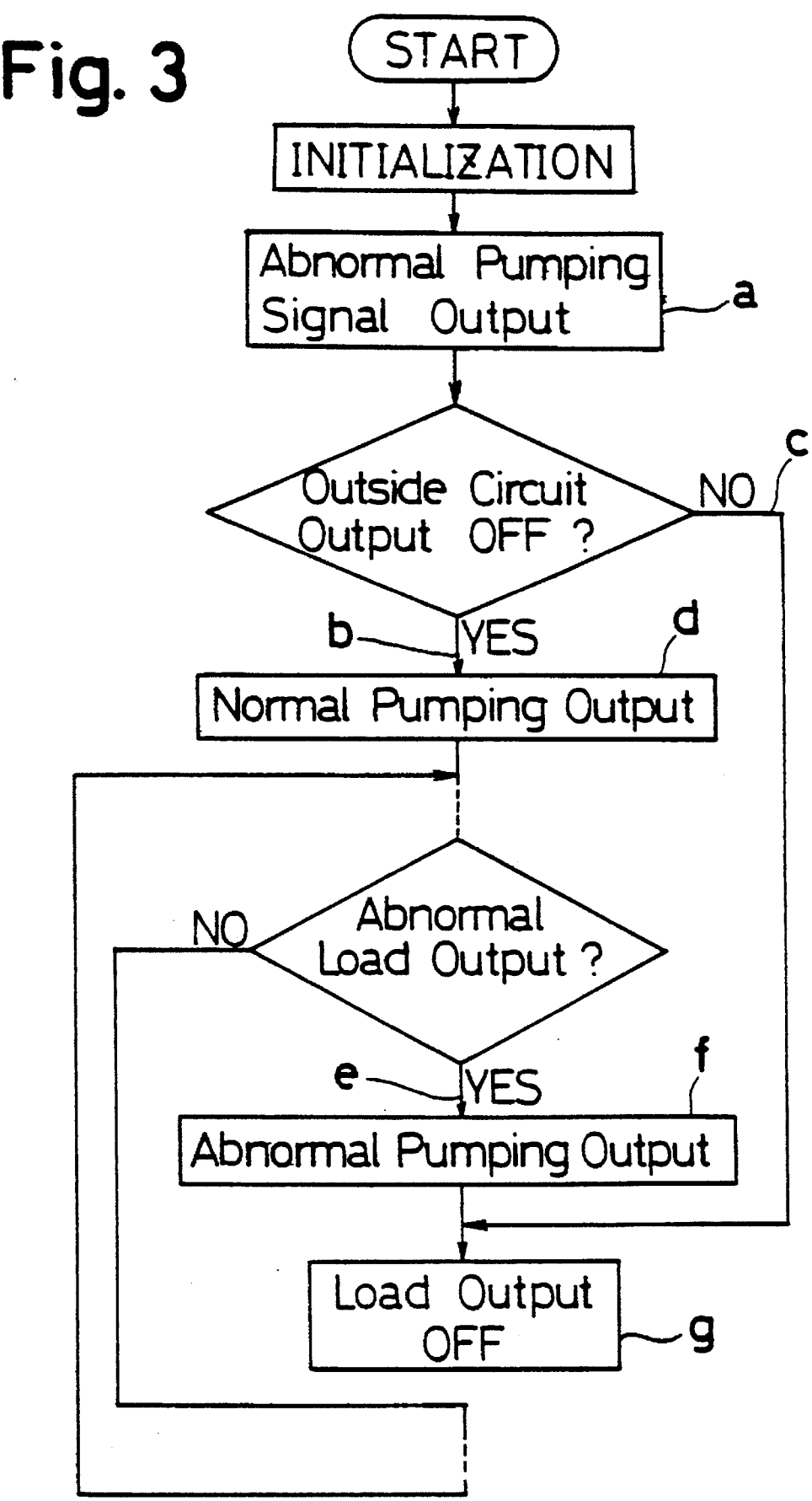
FIG. 3 and FIG. 4 are flowcharts each of which shows procedures upon detection of an abnormal condition.
Figure 4:
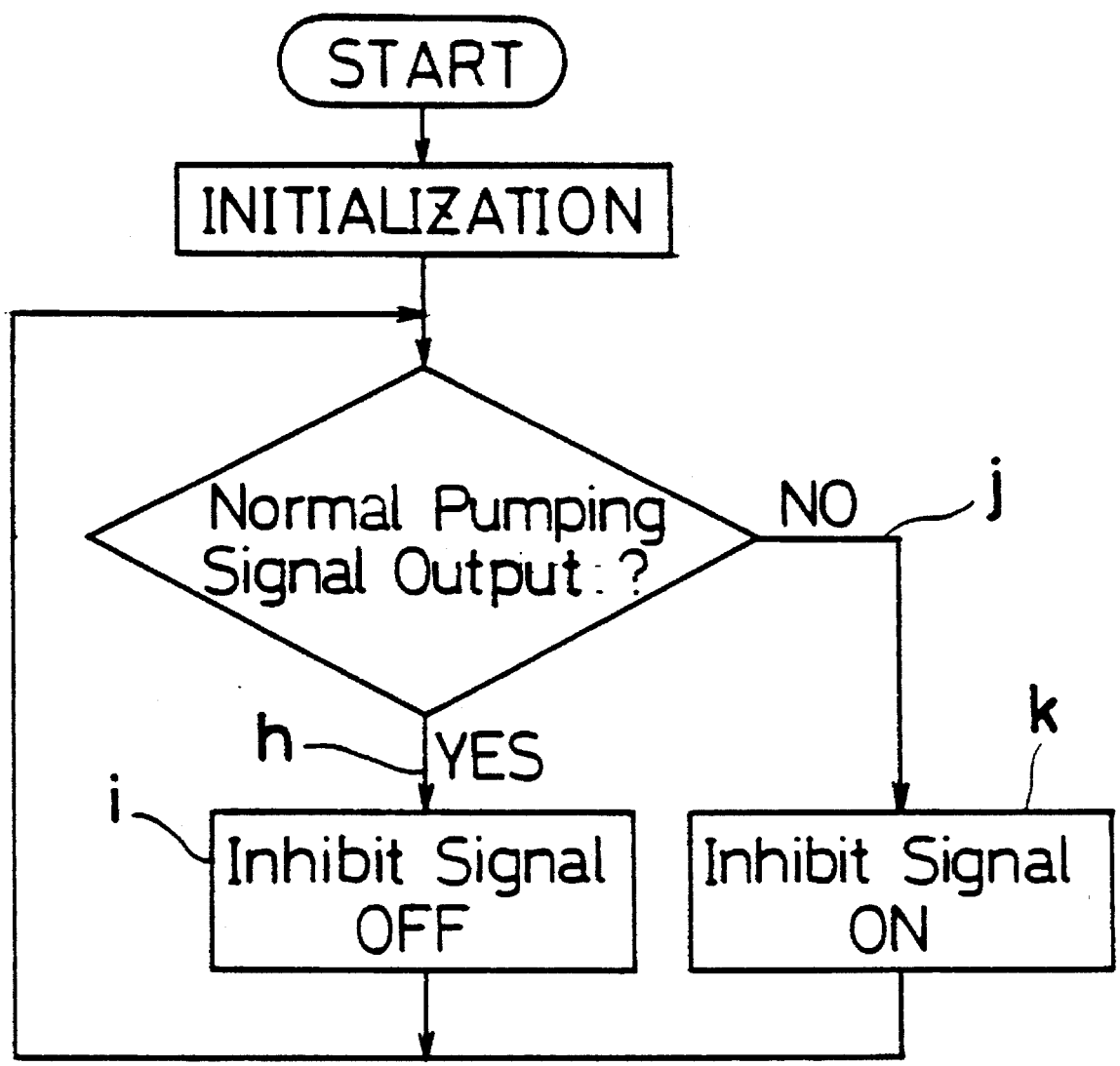
Figure 5:
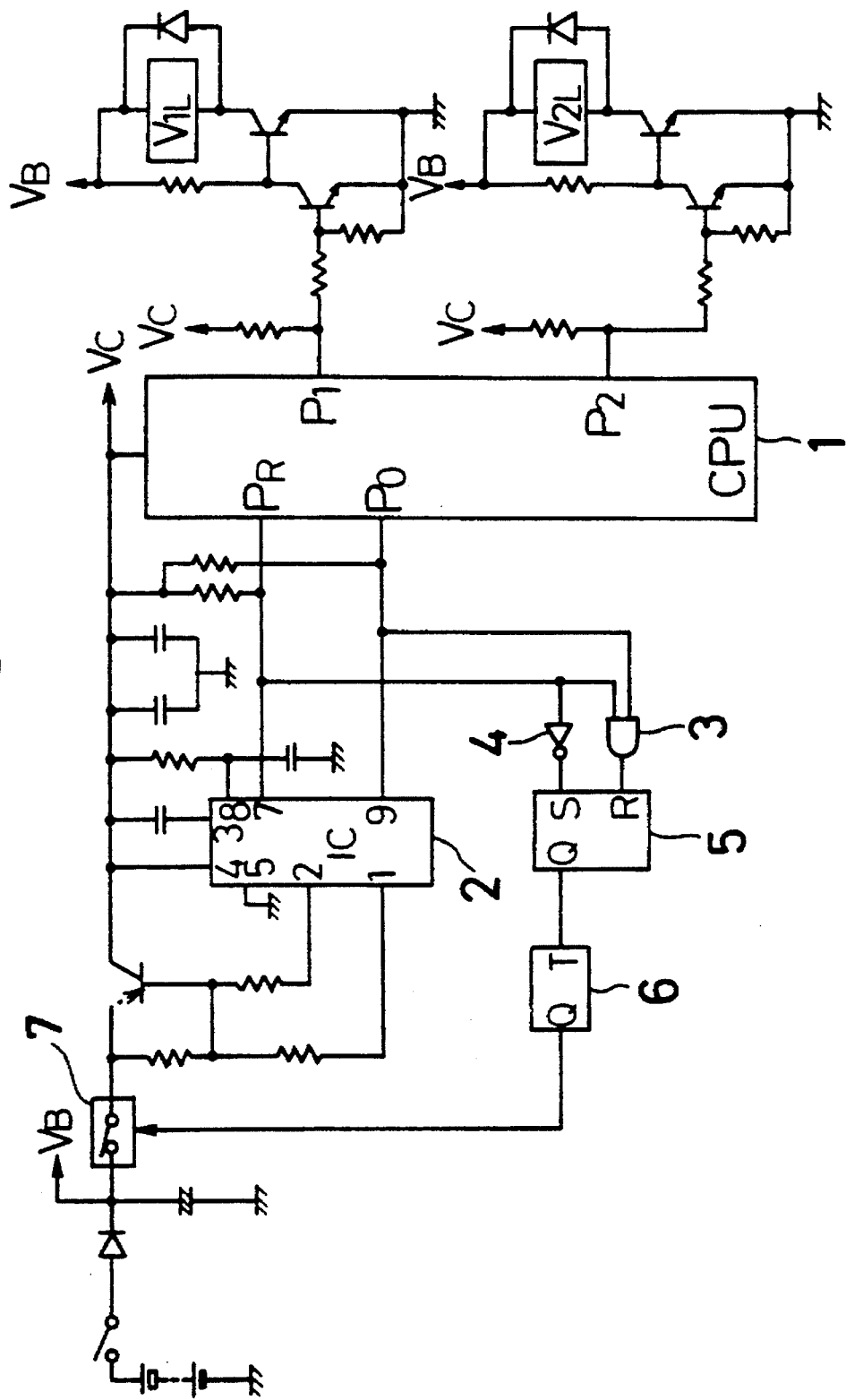
FIGS.5 is an electric circuit of a conventional antilock brake control system.

Next will be detailed an operation of the antilock brake system having the foregoing control device based on flow charts shown in FIGS. 3 and 4.

In FIG. 3, in order to check whether the inhibiting circuit 24 functions or not, an abnormal pumping signal is fed thereto from the output judging circuit 22(a) and at this time if the interruption of the load output signals have been established by the inhibiting circuit 24, the circuit 24 is deemed to be normally functionable, advancing the following main routine (b). If the inhibiting circuit 24 is found to be malfunctioning, the ECU interrupts the outputting of load output signals from the output judging circuit 24.

It is noted that the foregoing operation or function check for the inhibiting circuit 24 can be performed by connecting the load output port to the input port for checking the inhibiting circuit in the ECU.

While the inhibiting circuit 24 is in normal functional operation, after the foregoing checking, a normal pumping signal is issued (d). Upon detection of abnormal condition in the load output (e), an abnormal pumping signal α is issued from the output judging circuit 22 to the inhibiting circuit 24(f), which results in the interruption of the load output by the inhibiting circuit 24(g). It is noted that the foregoing method for detecting the load output is as same as the conventional one.

In FIG. 4 which shows a control operation in the inhibiting circuit 24, the inhibiting circuit 24 is designed to check whether the normal pumping signal α is issued or not. If the result is positive (h), the outputting of the inhibiting signal is terminated (i) and in case of negative result (j) the outputting of the inhibiting signal is brought into issue (k).

As a result of the foregoing control device, despite of the failure or malfunction of the monitoring circuit for resetting the ECU, upon issue of the abnormal signal from the ECU due to its failure or malfunction thereof, for the prevention of the outputting of the load signals, each of the switch S1, solenoid valves 15R, 15L, 17R and 17L, and switch S2 remaining in OFF-condition, thereby ensuring the ordinary brake operation.

As mentioned above, in accordance with the present invention, in the event of failure or malfunction in the electric control device for controlling the antilock brake system, the antilock brake system can fulfil its ordinary brake operation resulting in the avoidance of the danger of a non-braking condition.

Obviously, numerous modifications and variations of the present invention are possible in light of the above teachings. It is therefore to be understood that within the scope of the appended claims, the invention may be practised otherwise than as specifically described herein.

What is claimed is:

1. An anti-lock brake control system comprising:

a reservoir for storing therein an amount of fluid;

a master cylinder;

a plurality of wheel cylinders provided for a plurality of corresponding wheels;

a plurality of control valves each of which is designed for establishing fluid communication of a respective wheel cylinder to a selected one of the master cylinder and the reservoir;

a plurality of solenoids each of which is connected to a battery and a control valve;

a first switch for turning on said solenoids concurrently to activate the corresponding control valves;

motor means including a motor, a second switch interposed between the motor and the battery, and a pump driven by the motor upon closure of the second switch for returning the fluid from the reservoir to the master cylinder;

control means for controlling the solenoids and the motor means based on the rotational speed of any one of the wheels;

pumping signal output means for outputting a pumping signal when the pumping signal indicates a normal condition; and inhibiting means for opening the first and the second switches when the pumping signal indicates an abnormal condition.

\* \* \* \* \*